(12) United States Patent
Ho et al.

(10) Patent No.: US 7,274,529 B2
(45) Date of Patent: Sep. 25, 2007

(54) DISK DRIVE WITH ADAPTIVE ACTUATOR BRAKING UPON UNEXPECTED POWER LOSS

(75) Inventors: Peter Kuikong Ho, Morgan Hill, CA (US); Lee DuyLy Nguyentran, San Jose, CA (US); Bond-Yen Ting, San Jose, CA (US); Phong Van Vu, San Jose, CA (US)

(73) Assignee: HItachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/352,501

(22) Filed: Feb. 10, 2006

(65) Prior Publication Data

US 2007/0188906 A1    Aug. 16, 2007

(51) Int. Cl.
    *G11B 21/02*    (2006.01)
(52) U.S. Cl. .......................................................... 360/75
(58) Field of Classification Search ...................... None
    See application file for complete search history.

(56) References Cited

U.S. PATENT DOCUMENTS

| | | | |
|---|---|---|---|
| 4,831,469 A | 5/1989 | Hanson et al. | |
| 5,615,064 A | 3/1997 | Blank et al. | |
| 6,025,968 A | 2/2000 | Albrecht | |
| 6,081,400 A * | 6/2000 | Lu et al. | 360/75 |
| 6,282,049 B1 * | 8/2001 | Cameron et al. | 360/75 |
| 6,490,116 B1 * | 12/2002 | Watanabe et al. | 360/75 |
| 6,560,057 B1 * | 5/2003 | Klaassen et al. | 360/75 |
| 6,721,119 B1 * | 4/2004 | Hassan et al. | 360/75 |
| 6,754,019 B2 | 6/2004 | Tolizono et al. | |
| 7,068,460 B2 * | 6/2006 | Brenden et al. | 360/75 |
| 7,072,135 B2 * | 7/2006 | Suzuki | 360/75 |
| 7,145,742 B2 * | 12/2006 | Brenden et al. | 360/75 |
| 2001/0012171 A1 | 8/2001 | Lu et al. | |
| 2003/0227707 A1 | 12/2003 | Kokami et al. | |
| 2004/0075934 A1 | 4/2004 | Tan et al. | |

* cited by examiner

*Primary Examiner*—K. Wong
(74) *Attorney, Agent, or Firm*—Thomas R. Berthold (57) ABSTRACT

A magnetic recording hard disk drive (HDD) uses adaptive braking of the voice coil motor (VCM) actuator upon unexpected loss of power during a track seek. An adaptive braking controller applies a preselected value of brake voltage to the VCM to reverse the motion of the freely-moving actuator. The value of the selected brake voltage is determined from the actuator velocity. A set of brake voltage values is stored in memory in the HDD, and each brake voltage value corresponds to a band of track seek lengths, with each band representing a range of actuator velocities. For each seek, the value of brake voltage corresponding to the band in which the seek length falls is stored in a register. If emergency power-off (EPO) occurs during the seek, the value of brake voltage is recalled from the register and applied to the VCM to brake the VCM. After the VCM has been adaptively braked in this manner, actuator retract occurs to unload the heads.

8 Claims, 7 Drawing Sheets

DISK DRIVE WITH ADAPTIVE ACTUATOR BRAKING UPON UNEXPECTED POWER LOSS

BACKGROUND OF THE INVENTION

1. Field of the Invention

The invention relates generally to disk drives, and more particularly to a magnetic recording load/unload type of disk drive that unloads the recording heads when disk drive power is removed.

2. Description of the Related Art

Magnetic recording hard disk drives (HDDs) are information storage devices that use rotatable disks with concentric data tracks containing the information, a head or transducer for reading and/or writing data onto the various tracks of each disk surface, and an actuator for moving the heads. Each head is located on a head carrier and each carrier is connected to the actuator by a suspension. The actuator is a voice coil motor (VCM) comprising a coil movable through a magnetic field generated by a fixed permanent magnet assembly. The HDD has a servo control system that receives a position error signal (PES) from servo positioning information read by the heads from the data tracks and generates a VCM control signal to maintain the heads on track (track "following") and move them to the desired track (track "seeking") for reading and writing of data. The disks are stacked on a hub that is rotated by a disk drive motor, also called a spindle motor. A housing supports the spindle motor and actuator, and surrounds the heads and disks to provide a substantially sealed environment for the head-disk interfaces.

The head carrier is typically an air-bearing slider that rides on a bearing of air above the disk surface when the disk is rotating at its operational speed. The slider is maintained next to the disk surface by a suspension that connects the slider to the actuator. The slider is either biased toward the disk surface by a small spring force from the suspension, or is "self-loaded" to the disk surface by means of a "negative-pressure" air-bearing surface on the slider.

In a "load/unload" type of HDD, the sliders are mechanically unloaded from the disks when power is turned off, and then loaded back to the disks when the disks have reached a speed sufficient to generate the air bearing. The loading and unloading is typically done by means of ramps that contact the suspensions when the actuator is moved away from the data regions of the disks. Each slider is thus "parked" off its disk surface with its suspension, or a tap extending from the suspension, supported in a recess of the ramp. Load/unload HDDs provide a benefit in laptop computers because the parking of the sliders on the ramps away from the disk surfaces also provides some resistance to external shocks caused by moving or dropping the computer.

The parking of the sliders on the load/unload ramps when HDD power is removed is typically accomplished by use of the back electromotive force (EMF) generated by the freely rotating spindle motor. When the HDD is powered down, or in the event of unexpected loss of power (an emergency power-off or EPO event), actuator retract circuitry disconnects the VCM from its driver circuitry and connects it to a rectifier circuit that is coupled to the spindle motor. The output of the freely-rotating spindle motor is converted by the rectifier circuit to a DC current supplied to the coil of the VCM. This causes the VCM to retract to move the sliders to the ramps. A significant amount of torque is needed to ensure that the sliders are fully parked on the ramp, regardless of the VCM position or velocity at power down or EPO. The actuator velocity during retract needs to be controlled to avoid the sliders hitting the ramps at high speed. Excessive slider motion can cause the sliders to contact the ramp structure, or perhaps other sliders. Such contact can result in slider damage or transfer of contamination to the air-bearing surface, which can lead to head-disk interface failures.

In normal power down, the movement of the actuator can be controlled by software that controls the retract circuitry. However, during EPO, in which power to the HDD is lost unexpectedly, the software control is not active. The current supplied to the VCM during EPO retract must be large enough to unload the sliders to the ramps but small enough to prevent the suspensions and sliders from impacting the ramps at excessive speed. The EPO retract is acceptable if EPO occurs when the actuator is track following and thus has no initial velocity. However, safe retract becomes problematic if EPO occurs during track seeking, when the actuator is moving. The actuator seek velocity depends on the seek length, and can be considerably high, so that the actuator retract velocity can be significantly increased due to the initial velocity of the actuator. To address this problem, if EPO occurs during a track seek HDDs use dynamic braking of the VCM to release residual energy inside the VCM to ground before initiating actuator retract. The VCM dynamic braking is designed to brake the actuator for short track seeks, when the actuator velocity is low. For medium and long track seeks from outside diameter (OD) to inside diameter (ID) direction, the dynamic braking may be too weak so that the actuator impact speed on the ID crash stop is still high and later causes the sliders to stall at the ramps or rebound back from the ramps towards the disks. The stalling and rebounding of the sliders can cause damage to the heads and disks. For medium and long track seeks from ID to OD direction, the dynamic braking is not strong enough to avoid high speed impact during unloading. High speed impact between the sliders and the ramps also can cause damage to the heads and disks.

What is needed is an HDD with a reliable method for braking the actuator if EPO occurs during a track seek.

SUMMARY OF THE INVENTION

The invention is a HDD with adaptive braking of the VCM upon unexpected loss of power during a track seek. An adaptive braking controller applies a preselected value of brake voltage to the VCM to reverse the motion of the freely-moving actuator. The value of the selected brake voltage is determined from the actuator velocity. In one embodiment, a set of brake voltage values is stored in memory in the HDD, and each brake voltage value corresponds to a band of track seek lengths. Because the actuator velocity is directly related to the length of the seek being performed, the track seek lengths can be grouped into bands, with each band representing a range of actuator velocities. For each seek, the value of brake voltage corresponding to the band in which the seek length falls is stored in a register. If EPO occurs during the seek, the value of brake voltage is recalled from the register and applied to the VCM to brake the VCM. After the VCM has been adaptively braked in this manner, actuator retract occurs to unload the heads. In one embodiment the adaptive braking only occurs if the actuator velocity at EPO is above a predetermined threshold value. The actuator velocity at EPO can be determined from the VCM back EMF voltage at EPO. The VCM back EMF voltage is compared to a reference voltage and if it is below the reference voltage, conventional VCM dynamic braking occurs by shorting the VCM to ground.

For a fuller understanding of the nature and advantages of the present invention, reference should be made to the following detailed description taken together with the accompanying figures.

DETAILED DESCRIPTION OF THE INVENTION

Figure 1:
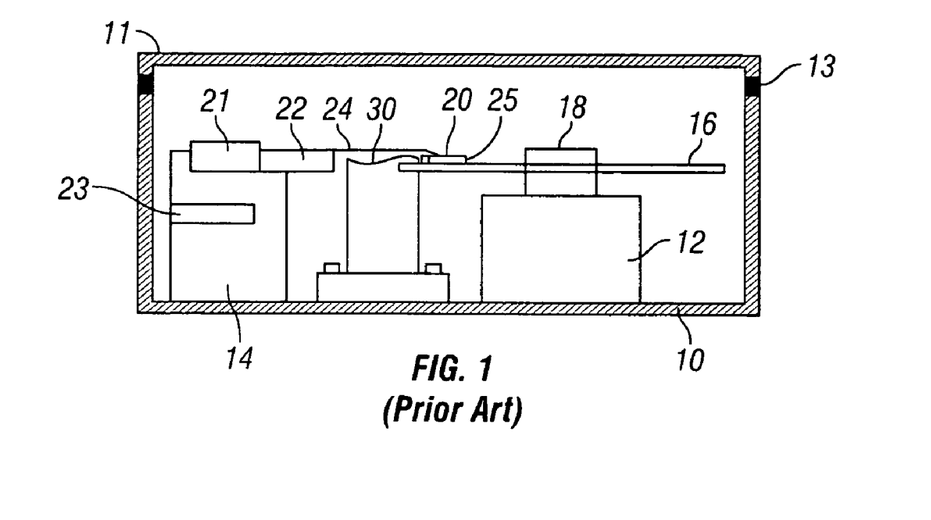
FIG. 1 is a sectional schematic of a conventional HDD.
Figure 2:
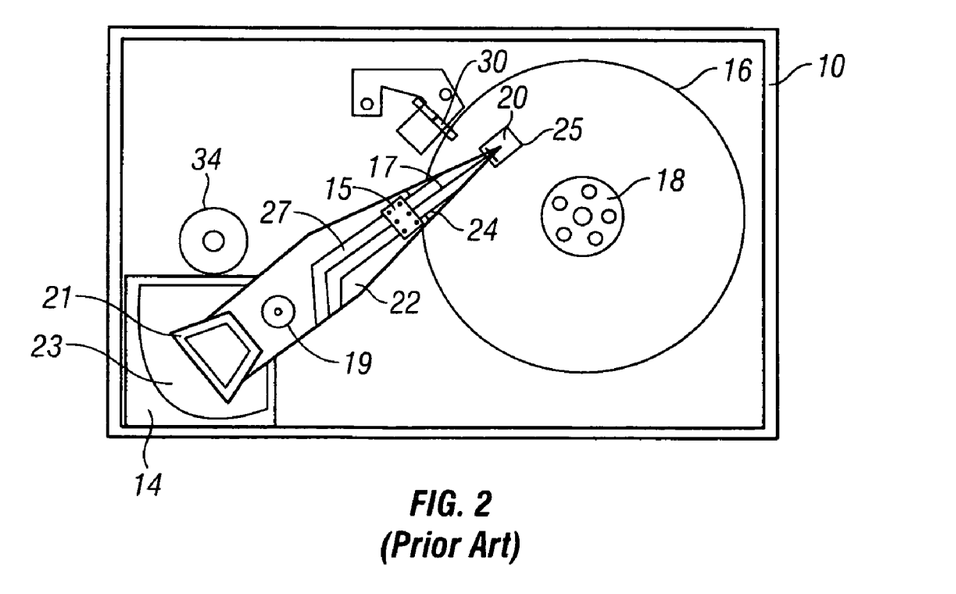
FIG. 2 is an open top view of the HDD depicted schematically in FIG. 1 and shows the head load/unload ramp.

Referring first to FIG. 1, there is illustrated in sectional view a schematic of a conventional HDD. For ease of illustration and explanation, the HDD depicted in FIGS. 1 and 2 is shown as having a single recording head and associated disk surface, although conventional HDDs typically have multiple heads and disks. The HDD comprises a base 10 to which are secured a spindle motor 12 and an actuator 14, and a cover 11. The base 10 and cover 11 provide a substantially sealed housing for the HDD. Typically, there is a gasket 13 located between base 10 and cover 11. A magnetic recording disk 16 is connected to spindle motor 12 by means of a spindle or hub 18. A read/write head or transducer 25 is formed on the trailing end of an air-bearing slider 20. Transducer 25 may be an inductive read and write transducer or an inductive write transducer with a magnetoresistive (MR) read transducer formed by thin-film deposition techniques as is known in the art. The slider 20 is connected to the actuator 14 by means of a rigid arm 22 and a suspension 24, the suspension 24 providing a biasing force that urges the slider 20 onto the surface of the recording disk 16. The arm 22, suspension 24, and slider 20 with transducer 25 are referred to as the head-arm assembly. During operation of the HDD, the spindle motor 12 rotates the disk 16 at a constant speed, and the actuator 14 pivots on shaft 19 to move the slider 20 generally radially across the surface of the disk 16 so that the read/write transducer 25 may access different data tracks on disk 16. The actuator 14 is a rotary voice coil motor (VCM) having a coil 21 that moves through the fixed magnetic field of magnet assembly 23 when current is applied to the coil.

FIG. 2 is a top view of the interior of the HDD with the cover 11 removed, and illustrates in better detail the suspension 24 that provides a force to the slider 20 to urge it toward the disk 16. The suspension 24 provides a gimbaled attachment of the slider 20 which allows the slider 20 to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via cable 17 to chip 15, which sends its output signals via cable 27.

A load/unload ramp 30 is mounted to the base 10. Ramp 30 contacts suspension 24 and lifts the slider 20 away from the disk 16 when the actuator 14 rotates the slider 20 toward the disk outside diameter when the HDD is powered down. An actuator crash stop 34 is mounted to the base 10 to prevent excessive movement of the actuator arm 22 and to assure that the suspension 24 does not move too far up ramp 30. The parking location for the actuator 14 when the HDD is stopped will be with the slider 20 unloaded off the disk 16 by the ramp 30 and the actuator up against crash stop 34.

Figure 3:
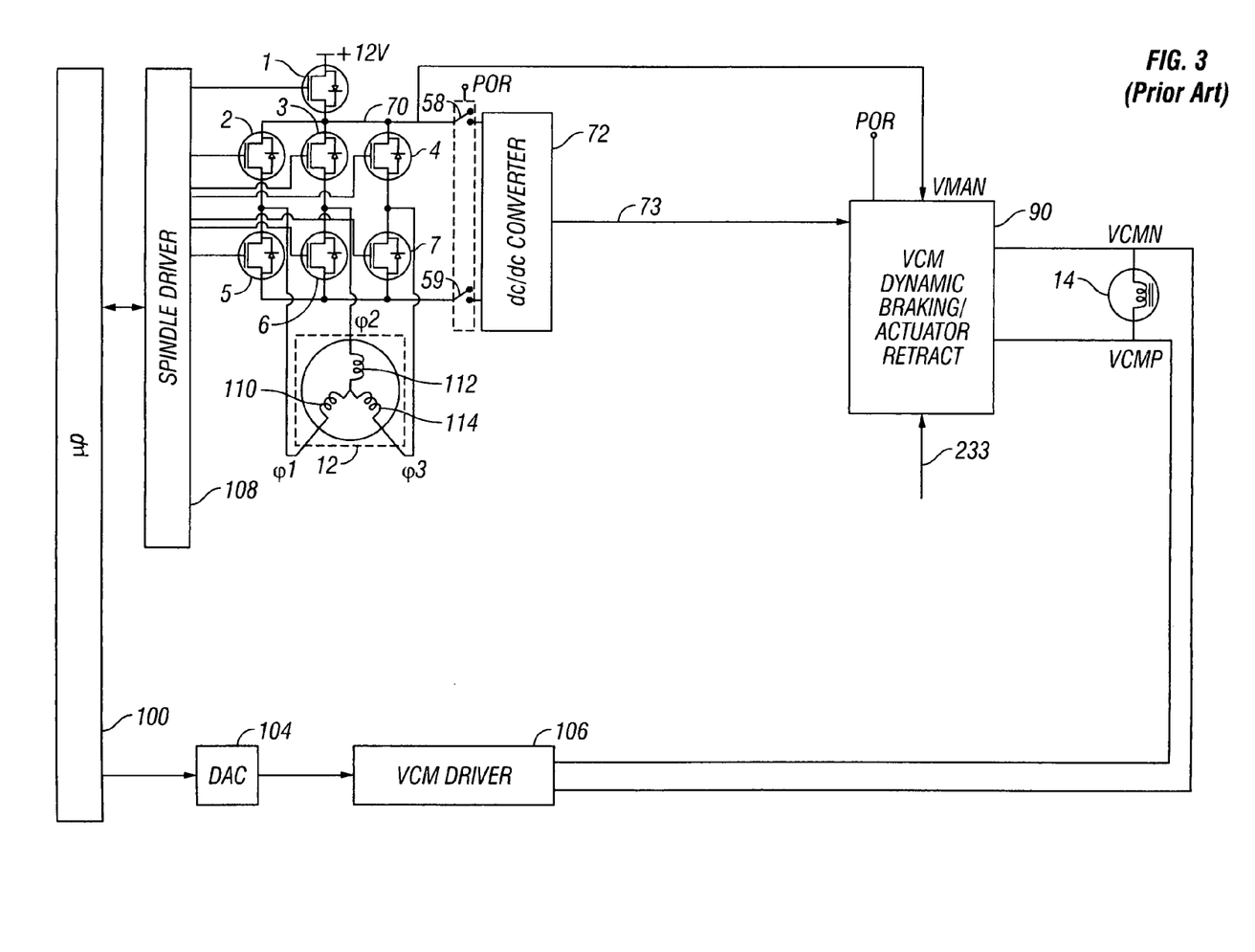
FIG. 3 is a block diagram of a HDD with VCM dynamic braking and actuator retract.

Referring now to FIG. 3, the HDD includes a microprocessor 100 that controls the VCM 14 and the spindle motor 12. During read and write operations, the microprocessor 100 receives head position servo information from disk 16 and generates digital output to a digital-to-analog converter (DAC) 104. DAC 104 is coupled to a VCM driver 106 that sends current pulses to the coil of VCM 14 to move the head 25 (FIG. 2) on slider 20 to the appropriate data track on disk 16 during track seeking, and to maintain the head 25 on track during track following. Microprocessor 100 also controls and is connected to the spindle motor 12 via spindle driver 108. The spindle driver 108 controls the current from the power supply (e.g., a 12V power source as shown in FIG. 3) to the windings of spindle motor 12 to rotate the motor at a constant rotational speed during HDD operation. In addition, the spindle driver 108 provides a status signal to microprocessor 100 indicating whether or not the spindle motor 12 is rotating at its operating speed. The spindle motor 12 may be a "delta" or "Y" (as shown in FIG. 3) type brushless, three-phase motor with fixed windings 110, 112, 114 as field coils and a permanent magnet rotor.

FIG. 3 also illustrates the spindle motor power stage/rectifier circuit 70 for driving the spindle motor 12 and for energizing the VCM 14 at HDD power down with the back EMF from spindle motor 12 windings 110, 112, 114. The spindle motor power stage/rectifier circuit 70 includes the isolation MOSFET 1 and six other MOSFETS 2, 3, 4, 5, 6, 7, which drive the three-phase spindle motor 12. The HDD can be powered by single +5V or +12V or both +5V and +12V power supply. In FIG. 3, +12V power is used. In normal HDD operation, the "power on reset" or POR signal is high, which makes the switches 58, 59 open. As a result, the DC/DC converter 72 and the VCM dynamic braking/actuator retract circuit 90 are disconnected from the system. The VCM 14 is also connected directly to rectifier circuit 70 via voltage line $V_{MAN}$ which is used to retract the actuator at normal or manual power down (other than EPO) when dynamic braking is not required because retract is under software control and HDD power.

The design of the VCM driver 106 and spindle driver 108 is such that when power is removed (POR signal goes low), their respective output lines to the VCM 14 and spindle motor 12 behave as open circuits (disconnected). When power is removed, MOSFET 1 is off, which is an open circuit to isolate the spindle power stage 70 from the 12V power supply. At the moment power is removed, switches 58 and 59 close. Switches 58, 59 may be relays, solid state switches such as field-effect transistors (FETs), or other switching devices. The VCM 14 and spindle motor 12 are then effectively disconnected from the VCM driver 106 and spindle driver 108, and connected to rectifier circuit 70. The rectifier circuit 70 includes semiconductor directional current control devices in the form of MOSFETS 2-7 which form a conventional three-phase, full-wave rectifier. When power is removed, the spindle motor 12 (and the disk stack mounted on it) continue spinning due to rotational inertia. Back EMF in the spindle motor 12 results in the generation of AC currents in the motor windings 110, 112, 114. The spindle motor 12 essentially behaves as a three-phase AC generator, and the resulting output current is rectified by the rectifier circuit 70. The output of the rectifier circuit 70 is a DC current that flows through the now closed switches 58 and 59 to DC/DC converter 72. The input of DC/DC converter is the spindle motor back EMF voltage. For example, if the spindle motor back EMF is about 9 volts, the output of DC/DC converter 72 would be about 3 volts and the DC/DC converter would continue to operate until the input decayed to 3 volts. The DC/DC converter 72 output on line 73 is connected to VCM dynamic braking/actuator retract circuit 90 which is coupled to the VCM 14. When circuit 90 has completed dynamic braking of the VCM, actuator retract is enabled and the output of DC/DC converter 72 is input to VCM 14, causing the VCM 14 to move slider 20 (FIG. 2) to the ramp 30. Various modifications of this actuator retract technique are known; for example U.S. Pat. No. 6,025,968 describes a multistage retract technique that applies first a low-level retract followed by a high-level retract.

Figure 4:
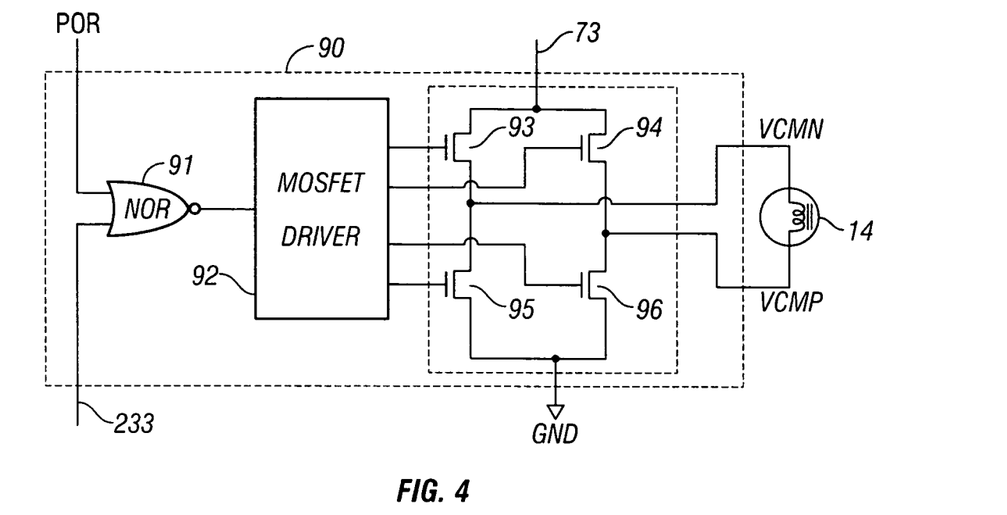
FIG. 4 is a block diagram of the VCM dynamic braking circuit for the HDD depicted in FIG. 3.

FIG. 4 shows the details of the VCM dynamic braking/actuator retract circuitry 90. VCM dynamic braking is active only if the actuator has an initial velocity less than some threshold or reference velocity $V_{ref}$ when EPO occurs. Circuit 90 includes a NOR gate 91 that receives as input the POR and a signal on line 233 that is low if the velocity is less than $V_{ref}$. NOR gate 91 drives MOSFET driver 92. If at the time of EPO (POR line low) the heads are track following or are performing short track seeks, then the VCM has essentially low actuator velocity so the output of line 233 will be low. When both POR line and line 233 are low, the output of NOR gate 91 will be high. When the control line (output of NOR gate 91) to MOSFET driver 92 is high, VCM dynamic braking is initiated. The MOSFET driver 92 puts both upper MOSFETs 93, 94 in tri-state mode (not driving the MOSFETs) and turns on both lower MOSFETs 95, 96 for a fixed period of time. This dynamic brake action causes residual energy inside the VCM motor to be released through MOSFETs 95, 96 to ground so the actuator can be easily retracted later. After the fixed time period, MOSFET driver 92 opens MOSFETs 93, 96 and closes MOSFETs 94, 95 so power on line 73 from DC/DC converter 72 will be directed to VCM 14 and actuator retract will occur.

However, if a long track seek is being performed at the time of EPO (POR line low), the actuator will have an initial velocity greater than $V_{ref}$ and line 233 will be high. The output of NOR gate 91 will be low and VCM dynamic braking will not occur.

In the present invention VCM braking is tuned depending on the velocity of the actuator when EPO occurs. By properly tuning of the VCM brake voltage (or current) and the brake time, the actuator speed can be controlled to a safe value. In one embodiment there are multiple brake voltages and brake times corresponding to multiple bands of seek lengths. The actuator velocity depends on the seek length. For long seeks, the actuator speed is high, hence hard VCM braking is required, while for short seeks less VCM braking is required. The invention uses a register in the VCM driver to store the VCM brake parameters (voltage and time). If seek length changes, this register is updated. When EPO occurs, the VCM brake is initiated based on the VCM brake parameters stored in the register. For example, in one particular HDD with three-band VCM braking, a brake voltage (3 volts) and brake time (2 msec) is applied if the seek length is more than 9,000 tracks, a brake voltage (3 volts) and brake time (1 msec) is applied if the seek length is more than 5,000 tracks but less than or equal to 9,000 tracks, and a brake voltage (2 volts) and brake time (1 msec) is applied if the seek length is less than or equal to 5,000 tracks.

Figure 5:
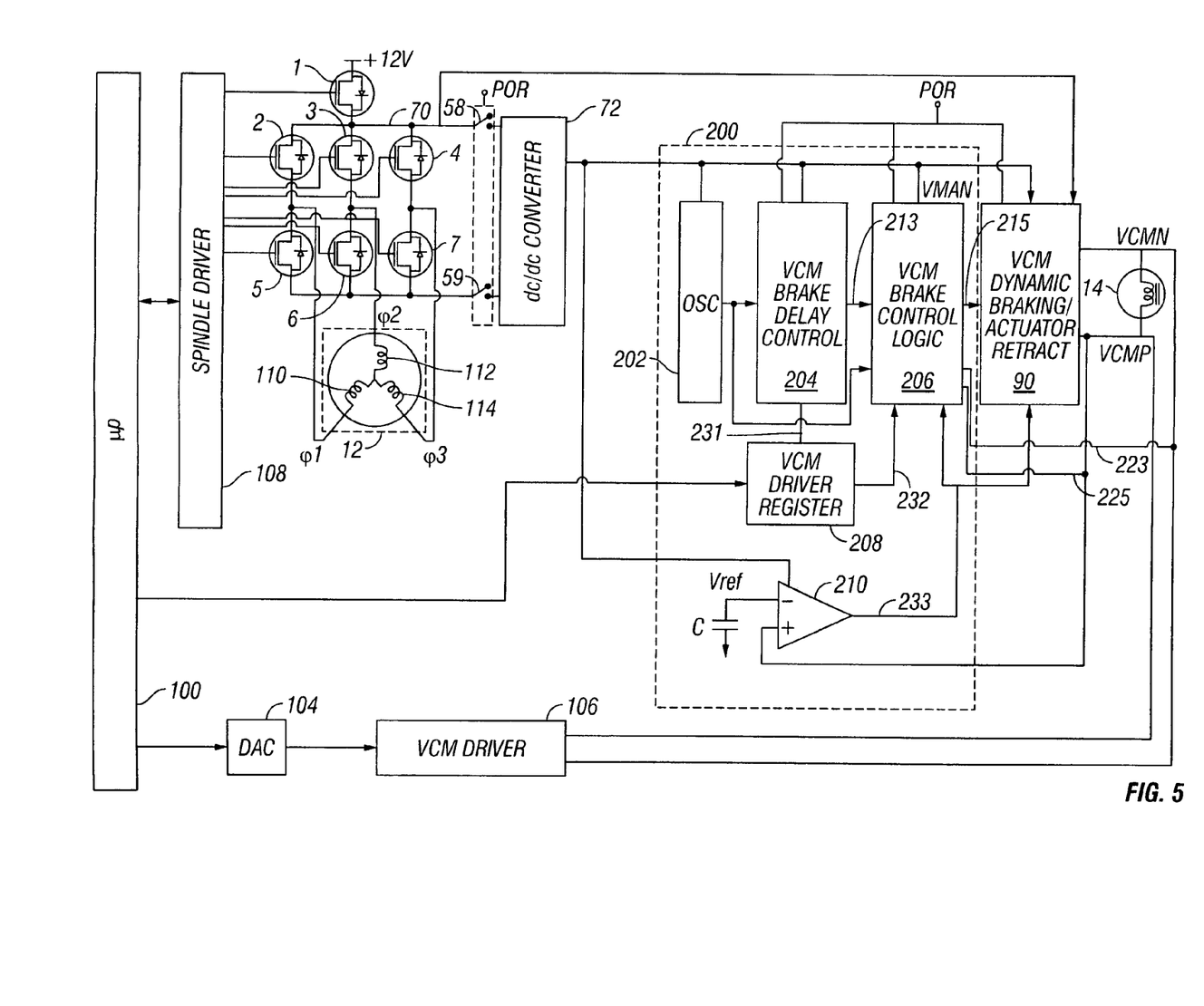
FIG. 5 is a block diagram of a HDD according to the invention with adaptive VCM braking and actuator retract.

FIG. 5 is a block diagram of the HDD implementing the invention. The adaptive VCM braking circuit 200 includes oscillator 202, VCM brake delay control 204, VCM brake control logic 206, VCM driver register 208 and comparator 210. The VCM brake voltage and brake time are programmed into the VCM driver register 208 by microprocessor 100 which merely writes the proper control bits to the VCM driver register. For each seek, the servo control system knows whether a seek is a forward seek from outside diameter (OD) to inside diameter (ID), or a reverse seek from ID to OD, so the microprocessor 100 also writes the proper polarity of the brake voltage to VCM driver register 208. Before each seek, the servo control system will check the target seek length. If the target seek length is not in the same band as the previous seek, then the VCM driver register is updated with the new brake voltage (BV) and new brake time (BT). If the target seek length is in the same band as the previous seek, then the VCM driver register is not updated. When EPO occurs during a seek, the VCM brake control logic 206 will apply the BV and BT stored in the VCM driver register. The VCM driver register 208 feeds BT to VCM brake delay control 204 via line 231 and feeds the reverse BV to VCM brake control logic 206 via line 232. The reverse BV is the voltage that generates the current to oppose the seek current to slow down the actuator velocity. When EPO occurs, the POR signal goes low, which closes the switches 58, 59. The POR signal also enables the VCM brake delay control 204, the VCM brake control logic 206, and the VCM dynamic braking/actuator retract circuit 90.

In one example of a HDD with the invention, the output $V_{out}$ of DC/DC converter 72 is 3 volts. The DC/DC converter 72 continues to operate until the input decays to 3 volts. Because the spindle motor back EMF depends on motor design and its rotational speed, care should be taken when choosing the output of the DC/DC converter 72 to assure there is enough back EMF voltage and time to maintain $V_{out}$ for the adaptive VCM brake operation and actuator retract. $V_{out}$ drives the oscillator 202, the VCM brake delay control 204, the VCM brake control logic 206 and comparator 210. The oscillator 202 provides timing to VCM brake delay control 204 and VCM brake control logic 206.

The inverting terminal of the comparator 210 is connected to a capacitor, which is charged to 1.0 volt before power is removed. This voltage is the reference voltage, $V_{ref}$ for this comparator and represents a reference actuator velocity. The reference actuator velocity is not limited to the use of $V_{ref}$; it can be represented by threshold or reference value stored in a memory cell instead of a capacitor. Immediately upon the occurrence of EPO, the VCM driver 106 is tri-state (not driven), causing VCM coasting for a period of time, e.g., 486 microseconds in one particular HDD, during which actuator velocity is determined. Since the VCM is coasting, the VCM back EMF voltage, which is a function of actuator velocity, can be measured across the VCM coil terminals, VCMN and VCMP, and this voltage is input to comparator 210. In the example of FIG. 5, $V_{ref}$ of 1.0 volt corresponds to a velocity of 440 mm/s. The actuator velocity is compared with $V_{ref}$ at comparator 210. If the velocity is greater than 440 mm/s, the output of comparator 210 on line 233 will be high.

Figure 6:
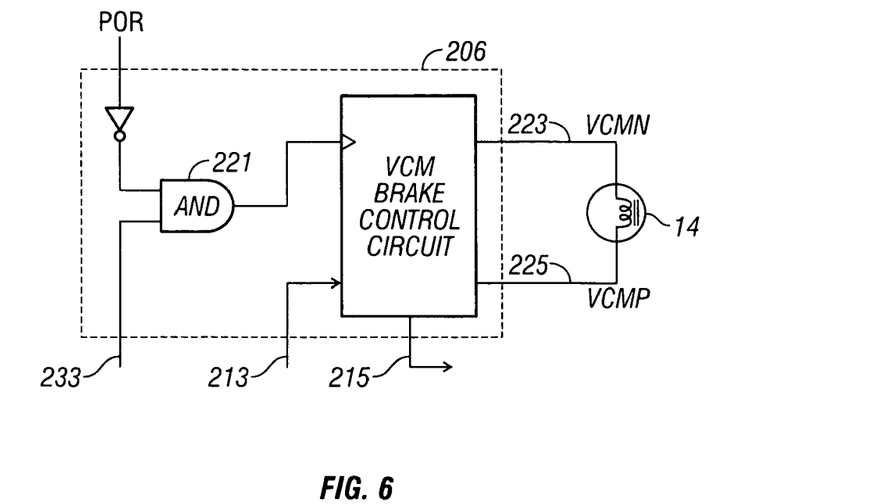
FIG. 6 is a block diagram of the VCM brake control logic for adaptive VCM braking for the HDD depicted in FIG. 5.

FIG. 6 is a block diagram of VCM brake control logic 206. The comparator output on line 233 and the inverse of the POR line are input to AND gate 221. When the output of AND gate 221 is high, it will initiate the VCM brake control circuit to slow down the seek velocity, applying the previously loaded BT and reverse BV to VCM 14 via lines 223, 225. After adaptive VCM braking, the logic will initiate actuator retract via line 215 to unload the sliders to the ramps. If the actuator velocity is less than 440 mm/s, the output of comparator 210 on line 233 will be low, the output of AND gate 221 will be low, and adaptive VCM braking will not occur. However, the comparator output on line 233 and the POR line are input to NOR gate 91 (FIG. 4) in VCM dynamic braking circuitry 90. So as described previously, when both POR and comparator 210 output on line 233 are low, the output of NOR gate 91 will be high and VCM dynamic braking will occur.

Figure 7:
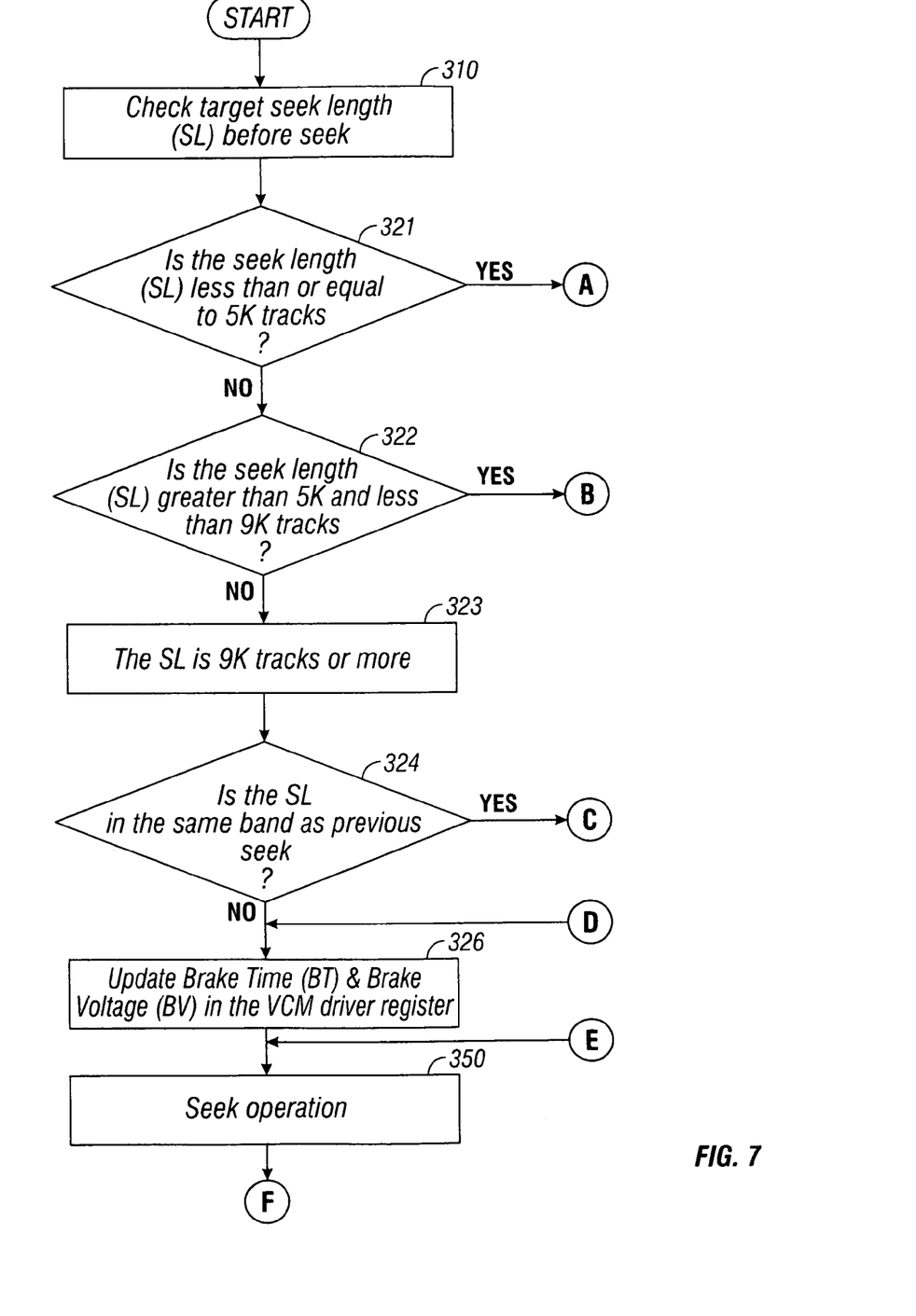
FIG. 7 is a flow chart illustrating the adaptive VCM braking method of the invention.

FIG. 7 is a block diagram explaining operation of the HDD with the invention. In block 310, for each seek the target seek length is checked. In blocks 321, 322 and 323 the seek length is divided into three bands; however the invention is not limited to three bands. Block 321 tests if the seek length equal to or less than 5,000 tracks (short seek). Block 322 tests if the seek length is greater than 5,000 tracks, but less than 9,000 tracks (medium seek). Block 323 tests if the seek length is equal to or greater than 9,000 tracks (long seeks).

At block 324 the microprocessor checks the target seek length and if the target seek length is not in the same seek band (short seek band, medium seek band, or long seek band) as the previous seek, then at block 326 the VCM driver register is updated with the VCM brake control parameters: the brake time (BT) and the reverse brake voltage (BV). If the target seek length is in the same seek band as the previous seek, then the VCM driver register does not need to be updated (block 328) because the content of the VCM driver register is already set for this seek length. Skipping this unnecessary register update saves time and operation.

Next at block 350 the seek operation is executed. At block 352, EPO occurs during the seek. At EPO, the VCM is in coasting mode for time T (in one example T is 486 microseconds) during which time actuator velocity is measured (block 354). If at block 358 the velocity is less than the reference velocity (in the example described above this would represent the output of comparator 210 being low) then conventional VCM dynamic braking is initiated (block 360). Thus MOSFETs 95, 96 (FIG. 4) are turned on for a fixed time, e.g., 2.5 ms in one example, to release the stored energy in the VCM coil to ground to slow down the VCM.

If at block 358 the velocity is greater than the reference velocity (in the example described above this would represent the output of comparator 210 being high) then adaptive VCM braking according to this invention is initiated (block 365). The appropriate VCM brake control parameters BT and BV, which have been stored in the VCM driver register before EPO occurred, are applied to the VCM to slow down the actuator. The reverse voltage is the voltage that will generate a current which opposes the seek current. In one example of a HDD a short brake time (1 msec) and low brake voltage (2 volts) is applied across the VCM coil in the short seek band, a short brake time (1 msec) and high brake voltage (3 volts) is applied in the medium seek band, and a longer brake time (2 msec) and higher brake voltage (3 volts) is applied in the long seek band.

After conventional dynamic braking (block 360) or adaptive VCM braking (block 365), actuator retract occurs. The VCM braking reduces the seek velocity to near zero, but does not unload the sliders to the ramps. Therefore, actuator retract is required. In one embodiment of a multistage retract, a low level retract applies 1V across the VCM coil for 194 ms (block 371), and a high level retract applies 3V for 200 ms (block 372) to move the sliders to the ramps.

At block 380, after actuator retract when the sliders have been unloaded to the ramps, all of the low sides of the MOSFETs in the three phase spindle motor are turned on to dump the stored energy in the spindle motor to ground to stop the spindle motor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A data recording disk drive comprising
a data disk having a plurality of data tracks;
a multiphase spindle motor having a winding for each phase and connected to the disk for rotating the disk;
a transducer for writing data to or reading data from the data tracks on the disk;
a carrier supporting the transducer;
a ramp for holding the carrier off the disk when the disk drive is not operating;
a voice coil motor (VCM) actuator that generates a back electromotive force (EMF) voltage when it is moving, the actuator connected to the carrier for moving the carrier generally radially across the disk in a track seek from one data track to another data track and for moving the carrier to the ramp;
a dynamic braking circuit coupled to the actuator for braking the actuator only when the VCM back EMF voltage is less than a predetermined threshold when power to the spindle motor is removed;
an adaptive brake controller coupled to the actuator for braking the actuator only when the VCM back EMF voltage is greater than said threshold when power to the spindle motor is removed, the adaptive brake controller being responsive to the length of the track seek at the time of spindle motor power removal; and
a rectifier circuit for converting back electromotive force from the spindle motor to current for the actuator to retract the carrier to the ramp when power to the spindle motor is removed and after the actuator has been dynamically or adaptively braked.

2. The disk drive of claim 1 wherein the adaptive brake controller includes circuitry for applying a voltage to the VCM actuator opposite to the VCM back EMF voltage, said reverse voltage being adjustable in response to the length of the track seek at the time of spindle motor power removal.

3. The disk drive of claim 2 wherein the adaptive brake controller includes circuitry for applying the reverse voltage for a brake time, said brake time being adjustable in response to the length of the track seek at the time of spindle motor power removal.

4. A magnetic recording disk drive comprising
a magnetic recording disk having a plurality of concentric data tracks;
a multiphase spindle motor having a winding for each phase and connected to the disk for rotating the disk;
a head for writing data to or reading data from the data tracks on the disk;
a slider supporting the head;
a voice coil motor (VCM) actuator that generates a back electromotive force (EMF) voltage when it is moving for moving the slider and head generally radially across the disk in a track seek from one data track to another data track;

a suspension connecting the slider to the actuator;

a ramp for holding the suspension off the disk when the disk drive is not operating;

an adaptive VCM brake controller for braking the VCM actuator only when the VCM back EMF voltage is greater than a predetermined threshold upon the occurrence of an unexpected loss of power to the spindle motor during a track seek, the adaptive brake controller capable of providing a plurality of VCM brake voltages, each brake voltage corresponding to a band of track seek lengths; and a rectifier circuit for converting back electromotive force (EMF) from the spindle motor to current for the VCM to retract the slider and suspension to the ramp after the VCM has been braked.

5. The disk drive of claim 4 wherein the adaptive VCM brake controller includes circuitry for applying each brake voltage for a brake time, said brake time being selectable according to the track seek length.

6. A method for unloading a head off a disk following an unexpected loss of power in a magnetic recording disk drive, the disk drive having a disk with a plurality of concentric data tracks, a multiphase spindle motor having a winding for each phase and connected to the disk for rotating the disk, a head for writing data to or reading data from the data tracks on the disk, and a voice coil motor (VCM) actuator that generates a back electromotive force (EMF) voltage when it is moving for moving the head across the disk in a track seek from one data track to another data track; the method comprising:

determining if the VCM back EMF voltage is above a predetermined threshold when loss of power occurs;

determining the length of a track seek being performed when loss of power occurs;

if the VCM back EMF voltage is above said threshold, selecting, in response to said track seek length, a value of VCM brake voltage to be applied to the VCM;

applying said selected VCM brake voltage to the VCM for a predetermined time; and after braking the VCM, directing current from the spinning spindle motor to the VCM to cause the VCM actuator to unload the head off the disk.

7. The method of claim 6 further comprising, if the VCM back EMF voltage is below said predetermined threshold when loss of power occurs, not applying said selected VCM brake voltage and shorting the VCM to ground to dynamically brake the VCM.

8. The method of claim 6 wherein selecting a value of VCM brake voltage comprises storing a set of predetermined brake voltage values and corresponding bands of track seek lengths, and selecting the brake voltage value corresponding to the band containing the determined track seek length.

* * * * *